Patented July 15, 1952

2,603,660

UNITED STATES PATENT OFFICE 2,603,660

PREPARATION OF DIALKYLALKANAMIDES

Rudolph L. Heider, Dayton, Ohio, assignor to Monsanto Chemical Company, St. Louis, Mo., a corporation of Delaware No Drawing. Application July 20, 1949, Serial No. 105,889

5 Claims. (Cl. 260—561)

The present invention is concerned with a chemical process for the production of particular chemical compounds.

It is an object of the invention to produce dialkyl acylamides by a novel process which avoids the difficulties inherent in processes of the prior art. It is a specific object of the invention to prepare dimethyl acetamide and higher dimethyl acylamides. Other objects of the invention will become apparent hereinafter.

The methods heretofore employed in the manufacture of dialkylamides have been characterized by difficulties in the separation of the desired compounds. For example, J. R. Ruhoff and E. Emmett Reid, in an article entitled "A Series of Aliphatic Dimethyl Amides" in the Journal of the American Chemical Society, 59, 401 (1937), describe the preparation of such compounds as azeotropic mixtures with acids. Such mixtures cannot be separated by ordinary distillation methods, so that the isolation of the dialkylamides requires the use of expensive treating methods.

It has now been found that the difficulties of the prior art may be overcome by the manufacture of alkyl-substituted acylamides by a process in which a tris(dialkylamido) phosphate is reacted with an aliphatic acid. The process of the present invention avoids the formation of interfering azeotropes, so that substantially pure amides may be prepared.

The preparation of tris(dialkylamido) phosphates is described in copending application, Serial No. 28,723, filed May 22, 1948, and assigned to the same assignee as is the present application. The higher substituted homologues of such phosphates may also be employed in the process of the present invention.

The preparation of a typical compound is shown below. The tris(dimethylamido) phosphate was prepared by reacting phosphoryl chloride, POCl₃, and dimethylamine in a solvent such as toluene. In carrying out this reaction, 153 g. of phosphoryl chloride in 2 liters of toluene were treated at about 50° with dimethylamine until saturation was observed. The reaction mixture was then heated to 100° C. while bubbling in further dimethylamine until saturation. The solid material was filtered off and was then heated to distill off toluene. The crude product was washed with small amounts of concentrated sodium carbonate in toluene. The pure tris(dimethylamido) phosphate which was obtained by distillation of the crude product gave a yield of 116 g. as a clear, colorless liquid having a boiling point of 76° at 1 mm. pressure and a refractive index, $n_D^{25} = 1.4570$. Other solvents which are inert with respect to the phosphoryl chloride may also be used. Thus, benzene, ethyl benzene, xylenes or mixtures thereof may also be used.

An equation expressing the probable course of the chemical reaction of the process of the invention is shown below as an illustration of a typical compound, namely, tris(dimethylamido) phosphate with acetic acid:

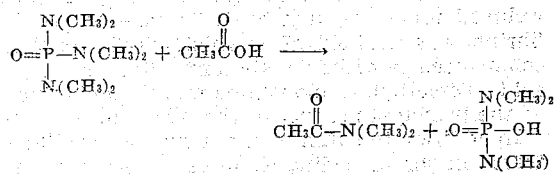

Similar relations are found to exist with respect to the higher homologous phosphates, and the modification of the above reaction by the use of the aliphatic acids, although various competing chemical reactions may occur at the same time. Since it is not possible at this time to state the entire mechanism of the reaction involved in the process of this invention, the invention is not limited by any theories as to the process of the invention.

Although the mechanism of the reaction is not entirely elucidated, it would appear that the aliphatic acid forms a complex, or is hydrogen-bonded to the tris(dimethylamido) phosphate, so that a maximum boiling azeotrope having a relatively high boiling point is obtained. In the heating and distillation step any excess acid is first removed, after which the hydrogen-bonded complex decomposes thermally to yield the dialkyl acylamide. Since there is no appreciable aliphatic acid present after this decomposition stage, the amide cannot form an azeotrope with an acid, so that the amide is obtained as a substantially pure product. The heating step does not require any critical temperature, but for convenience may be carried out at the boiling temperature of the dialkyl acylamide, either at atmospheric pressure or under vacuum, so that the product may be withdrawn by distillation.

The following examples illustrate the general process and type of reaction with which the invention is concerned, without, however, limiting the invention to the precise methods disclosed:

Example 1

150 ml. of tris(dimethylamido) phosphate were mixed with 150 ml. of glacial acetic acid in a reaction vessel. The mixture was heated and a vacuum of about 100 mm. Hg was applied to the system which was maintained under refluxing conditions by means of a distillation column mounted on the reaction vessel. After about one-half hour an overhead stream was withdrawn from the system at a still head temperature of 60° C. to 62° C. The preliminary forerun of 104 ml. corresponded to unreacted acetic acid as indicated by the refractive index, $n_D^{25}=1.3709$. The remainder of the distillation was carried out at a temperature of 96° C. at 80 mm. pressure and yielded 51.8 grams of dimethyl acetamide free from azeotropes. The refractive index of this product was $n_D^{25}=1.4358$.

The yield based upon the acetic acid was 73.5%.

*Example 2*

The use of formic acid was shown by a run in which one mole of tris(dimethylamido) phosphate was reacted with a 50% molar excess of formic acid. After equilibrium was reached in the distillation flask maintained under vacuum, the unreacted formic acid was distilled off, and the dimethyl formamide recovered as the primary product.

*Example 3*

In order to prepare dimethyl propionamide the reaction was charged with one mole of tris(dimethylamido) phosphate together with a 100% molar excess of propionic acid. The mixture was refluxed under vacuum at 100 mm. until equilibrium was attained, after which distillation was commenced to withdraw the unreacted propionic acid. Dimethyl propionamide was then obtained as the principal product of the reaction.

In addition to batch methods such as are illustrated in the preceding examples, the process of the present invention may be carried out as a continuous method. In continuous operation a reaction vessel equipped with a distillation column is continually charged with tris(dimethylamido) phosphate and the acid corresponding to the desired alkyl-substituted acylamide. The preferred acids which I may employ are the aliphatic acids having from one to five carbon atoms, although my process is also applicable to higher acids. The reaction vessel is heated by suitable means and is preferably equipped with vacuum connections so that the process may be carried out at lower temperatures to avoid side reactions and decomposition to high polymeric forms of phosphate compositions. The process may also employ a continuous removal of bottoms, such as the residual phosphorus compound. The continuous process in which tris(dialkylamido) phosphate and the desired aliphatic acids are continually charged employs a still from which a vapor stream is removed. This stream consists of unreacted acid which may be recycled to the process.

The bottoms from the first still or reactor are then charged into a second still, from which an overhead product consisting of the N,N'-dialkyl acylamide may be withdrawn. This second still is also equipped with a bottom draw-off for higher boiling materials.

The reaction may advantageously be carried out under reduced pressure in order to operate at a lower temperature and thereby prevent decomposition. However, the reaction may also be carried out at atmospheric pressure or at elevated pressures, if desired. The distillation step which is employed to separate the reaction product may be carried on during the continuous reaction of the above components in the reaction vessel, or distillation may be applied, following the preliminary reaction of the components in an autoclave or other suitable vessel. Distillation of the reaction mixture yields a forerun of acetic acid which is followed by a pure cut of dimethyl acetamide.

It is an advantage of the present process that no azeotrope is formed with the N,N'-dialkyl acylamide, so that the product is obtained free from water or acid. In contrast to this process, the method of Ruhoff and Reid, described above, which has been applied to the production of simple substituted amides, has the disadvantage that maximum boiling azeotropic mixtures of the N,N'-dialkyl acylamide and the corresponding aliphatic acid are obtained in the isolation of the final product. Such maximum azeotropic or constant-boiling mixtures cannot be separated by direct distillation, so that other methods must be employed at greater cost to obtain a pure product.

In general it is not critical to employ any particular proportions of the amidophosphate and the aliphatic acid, although it is preferable to employ an excess of the acid, so that the most effective utilization of the amidophosphate may be practised by hydrogen-bonding all of this constituent. The amidophosphate compound is preferably tris(dimethylamido) phosphate, and the acid is preferably in the group of 1 to 5 carbon atom aliphatic acids or alkanoic acids.

The reaction conditions are not critical and may be carried out at atmospheric pressure, or under vacuum or super-atmospheric conditions. However, it is preferable to employ a vacuum, so that the finished products, and unreacted components may be distilled overhead with a minimum of side reactions.

The reaction temperature is not critical since the preliminary bonding of the acid and the amidophosphate occurs very readily, although this loose combination is broken in the heating step in which the desired dialkyl acylamide is vaporized while heating. Such heating may preferably be done at the conditions corresponding to the boiling point of the dialkyl acylamide.

While I have described certain preferred forms of the invention, it is understood that this is by way of illustration only, and various changes may be made within the scope of the appended claims without departing from the spirit of the invention which is not to be limited to the specific embodiments herein-described or specifically covered by the claims.

What is claimed and is desired to be protected by Letters Patent of the United States is:

1. The process for preparing lower dialkyl acylamides, which comprises heating a mixture of a tris(dialkylamido) phosphate in which the alkyl groups have from 1 to 2 carbon atoms, with an alkanoic acid having from 1 to 5 carbon atoms, said alkanoic acid being in stoichiometric excess over the said tris(dialkylamido) phosphate, said reaction occurring at a temperature approximately that of the boiling point of the said dialkyl acylamides.

2. The process for preparing dimethyl acylamides, which comprises heating a mixture of tris(dimethylamido) phosphate with an alkanoic acid having from 1 to 5 carbon atoms, said alkanoic acid being in stoichiometric excess over the said tris(dimethylamido) phosphate, said reaction occurring at a temperature approximately that of the boiling point of the said dimethyl acylamides.

3. The process for preparing dimethyl formamide, which comprises heating a mixture of tris(dimethylamido) phosphate with formic acid, said formic acid being in stoichiometric excess over the said tris(dimethylamido) phosphate, said reaction occurring at a temperature approximately that of the boiling point of the said dimethyl formamide.

4. The process for preparing dimethyl acetamide, which comprises heating a mixture of tris(dimethylamido) phosphate with acetic acid, said acetic acid being in stoichiometric excess over the said tris(dimethylamido) phosphate, said reaction occurring at a temperature approximately that of the boiling point of the said dimethyl acetamide.

5. The process for preparing dimethyl propionamide, which comprises heating a mixture of tris(dimethylamido) phosphate with propionic acid, said propionic acid being in stoichiometric excess over the said tris(dimethylamido) phosphate, said reaction occurring at a temperature approximately that of the boiling point of the said dimethyl propionamde.

RUDOLPH L. HEIDER.

REFERENCES CITED

The following references are of record in the file of this patent:

UNITED STATES PATENTS

| Number | Name | Date |
| --- | --- | --- |
| 2,160,841 | Dreyfus | June 6, 1939 |
| 2,408,633 | Guenther et al. | Oct. 1, 1946 |

FOREIGN PATENTS

| Number | Country | Date |
| --- | --- | --- |
| 610,952 | Great Britain | Oct. 22, 1946 |